United States Patent Office 3,734,951
Patented May 22, 1973

3,734,951
CONTINUOUS PRODUCTION OF NEUTRAL ADIPIC ESTERS
Hubert Suter, Juergen Jahn, Franz Janka, and Friedrich Brunnmueller, Ludwigshafen, and Otto Bernd Claren, Mannheim, Germany, assignors to Badische Anilin- & Soda-Fabrik Aktiengesellschaft, Ludwigshafen (Rhine), Germany
No Drawing. Filed Oct. 12, 1970, Ser. No. 80,169
Int. Cl. C07c 69/44
U.S. Cl. 260—485 R                1 Claim

ABSTRACT OF THE DISCLOSURE

Continuous production of neutral esters of adipic acid and an alcohol in which solid adipic acid is mixed with alcohol in the molar ratio 1:2 in a mixing zone at from 120° to 180° and the mixture is esterified while boiling the alcohol and setting up the stoichiometric amount of alcohol in the liquid at from 180° to 250°.

---

The present invention relates to a new continuous process for the production of neutral adipic esters.

It is generally known that neutral adipic esters can be prepared by a batch type method of esterifying adipic acid with an alcohol. Conversion of this method to a continuous one causes great difficulty. It is characteristic of continuous processes that the reactants can be metered uniformly and that predetermined reaction conditions can be maintained within fairly narrow limits. If it is not possible to fulfil these two basic requirements, all the advantages of a continuous method, including long-term automatic operation and a constant output of a product having consistent quality, are lost.

In the methods available, however, adipic acid cannot be satisfactorily metered either in the liquid or solid state. In the liquid condition it is unstable and forms decomposition products, some of which react with the alcohol so that finally an ester is obtained which is either not utilizable in this form because or numerous impurities or which has to be freed from the impurities in an expensive purification stage. Adipic acid in the solid state tends to form lumps, particularly when it comes into contact with alcohol vapor. The result is that the supply lines for the adipic acid become clogged or that at least metering becomes irregular. The molar ratio of the reactants thus varies so that all the remaining reaction conditions (for example the reflux ratio of the alcohol and the processing conditions in general) have to be altered. The fact that the products (adipic esters) are themselves hardly volatile and consequently cannot be distilled by standard industrial methods makes matters worse. Since, in consequence of this, the product can only be purified indirectly (i.e. the impurities have to be removed from the product and not the product by phase conversion from most of the impurities) the number and amount of the impurities have to be kept to a minimum. The said metering problems cannot therefore be circumvented by using auxiliaries, for example solvents, because these always introduce further complications in the purification. It should also be remembered that extreme purity requirements are placed on neutral adipic esters such as are seldom required in the case of industrial mass products. As plasticizers for plastics, however, they have to be entirely odorless and resistant to change in temperature. Mere traces of impurities give rise to discoloration.

It is therefore the object of the present invention to prepare neutral adipic esters continuously while avoiding the said disadvantages.

We have found a process for the continuous production of neutral adipic esters from adipic acid and alcohols in which solid adipic acid is mixed with cyclohexanol or an alkyl alcohol having four to sixteen carbon atoms and which may contain methoxy or ethoxy groups in a mixing zone at 120° to 180° C. in a molar ratio of 1:2, this mixture is supplied to an esterification apparatus which is kept at from 180° to 250° C., the alcohol is maintained boiling therein, such an excess of alcohol is used that it is present in the stoichiometric amount in the liquid phase and the crude neutral ester is continuously withdrawn.

The adipic acid may be used in commercially available grades in coarsely crystalline or finely crystalline form. It usually contains up to 3% by weight of succinic acid and/or glutaric acid, but these amounts do not cause any trouble.

In accordance with their importance as components in the products, which are used almost exclusively as plasticizers for plastics, the alcohols used are branched or linear alkyl alcohols having from four to sixteen, preferably from eight to ten, carbon atoms, but cyclohexanol or methoxyalkanols or ethoxyalkanols having the said number of carbon atoms may also be used. Mixtures of different alcohols may also be successfully used. Examples of suitable alcohols are octan-1-ol, octan-2-ol, nonan-1-ol, decan-1-ol, cyclohexanol, 1-ethoxyethanol, 1-methoxyethanol and the various isooctanols, isononanols, isodecanols, isoundecanols, isododecanols and isotridecanols. 2-ethylhexan-1-ol has very special industrial significance. The alcohols may be used in the commercially available grades.

When the alcohols have a low boiling point, it is necessary to carry out the esterification at pressures of up to 20 atmospheres, so that the said temperatures can be maintained.

The condition that in adding the alcohol to adipic acid a molar ratio of 2:1 should be maintained is not critical. Deviations from this stoichiometric ratio are not detrimental but on the other hand do not bring any advantage.

A preferred method of carrying out the entire esterification reaction is as follows: The alcohol is first heated, without making it boil, to 120° to 180° C., if necessary under superatmospheric pressure and then supplied to a mixing zone, preferably made in the form of a long tube, which is wholly filled with alcohol so that only a small volume of vapor can form. Solid adipic acid is continuously metered into this mixing zone, in the required amount, for example through an airlock by means of a screw conveyer. Under the said reaction conditions (the rate of esterification is equal for most of the alcohols concerned) a mixture of solid adipic acid, alcohol, monoester, water and some diester is formed which, surprisingly, flows very well. Vapor formed in the mixing zone is condensed in the usual way and the alcohol is returned to the mixing zone after water of reaction has been separated from it. The preesterification mixture obtained in the mixing zone is then passed through a dip tube into the esterification vessel in which a temperature of from 180° to 250° C. prevails and which if necessary is at superatmospheric pressure. In most cases a temperature is chosen at which alcohol and water boil at standard pressure, the amount of heat supplied being such that about 10 to 20% molar of the total amount of alcohol is in circulation, vaporization, water separation and return, while in the liquid reaction phase alcohol and adipic acid should be present in a stoichiometric ratio, i.e. an excess of alcohol of about 10 to 35% molar is continuously maintained in the esterification apparatus. The mean residence time of the reactants at the esterification temperature is about two to twenty hours. To make the different between actual and mean residence times as small as possible, and thus to keep the reaction conditions as far as possible the same for all molecules, it is advisable to carry out the esterification, not in one apparatus (apart from the mixing zone), but in two or three successive apparatus having appropriately smaller volumes and with appropriately shorter mean residence times.

The esterification is allowed to proceed, in accordance with the said total residence time, until the reaction mixture has an acid number of 1 to 10. The crude ester thus obtained is placed in an intermediate tank and then passed through a falling film evaporator so that it is freed from residual alcohol which is returned to circulation.

Further processing of the crude ester (now devoid of alcohol) by neutralization (for example with caustic soda solution), distilling off volatiles, drying and filtration may be carried out by conventional methods. Moreover the acid hemiester can be separated from the aqueous alkaline washing solution by acidification with a mineral acid and also returned to the esterification cycle.

The method of the invention not only permits trouble-free large-scale continuous esterification of adipic acid with alcohols, but also gives products having excellent quality for use as plasticizers, particularly for polyvinyl chloride.

It may also be emphasized that it is not necessary in the esterification to use any kind of assistants such as solvents, entrainers or special catalysts; the reaction proceeds autocatalytically under the said conditions and this has a particularly advantageous effect on the stability of the ester.

The following example illustrates the invention.

EXAMPLE 260 parts (parts by weight as in the following) per hour of 2-ethylhexan-1-ol is heated to 150° C. and in a mixing zone at this temperature 146 parts per hour of solid finely crystalline adipic acid is added which is metered in through a screw conveyer; the molar ratio of alcohol to adipic acid is 2:1; the vaporized alcohol is condensed and continuously returned after water of reaction, which has also escaped, has been separated. A readily flowable mixture of adipic acid (still solid), the hemiester, the alcohol, small amounts of water of reaction and diester is immediately formed and this is passed into a vessel in the interior of which a temperature of 190° C. is maintained. In the esterification apparatus (consisting essentially of the vessel and a superposed stirrer motor and a return pipe for the alcohol) a constant excess of 30% molar of alcohol is maintained, the reflux ratio being regulated so that the esterification components are present in the liquid reaction phase in about the stoichiometric ratio.

The mixture is passed from the first esterification vessel into a second and thereafter into a third in which the same reaction conditions prevail as in the first. The residence time in each case is six hours. After a total residence time of eighteen hours, the reaction mixture has an acid number of 2, i.e. conversion is about 99%. The crude ester is first passed into a collecting container and thence continuously through a falling film evaporator where it is freed from residual alcohol at 180° C. and 100 mm. The alcohol is returned and the ester, which is still acid, is neutralized with dilute caustic soda solution and then washed with water. The ester is then dried by evaporation and filtered; di-2-ethylhexyl adipate is obtained as a water-clear odorless liquid having a color number of 10 (according to Hazen).

We claim:

1. A process for the continuous production of di-2-ethylhexyl adipate by the autocatalytic esterification of adipic acid with 2-ethylhexan-1-ol wherein solid adipic acid is mixed with said alcohol at 120° to 180° C. in a mixing zone in a molar ratio of 1:2, this mixture is supplied to an esterification apparatus kept at from 180° to 250° C. in which the alcohol is maintained boiling, such an excess of alcohol being used that it is present in a stoichiometric amount in the liquid phase, and the neutral crude ester is continuously withdrawn.

References Cited

UNITED STATES PATENTS 2,091,241  8/1937  Kvalnes _____ 260—475

FOREIGN PATENTS 1,421,995  12/1965  France _____ 260—475

LORRAINE A. WEINBERGER, Primary Examiner

E. J. SKELLY, Assistant Examiner

260—485 L, 485 P